United States Patent Office 3,468,848
Patented Sept. 23, 1969

3,468,848
POLYOXYMETHYLENE COPOLYMERS FROM TRIOXANE AN CYCLIC KETALS
Gianfranco Pregaglia, Milan, Paolo Roffia, Mantova, and Giancarlo Pozzi, Milan, Italy, assignors to Montecatini Edison S.p.A., Milan, Italy, a corporation of Italy
No Drawing. Filed July 1, 1966, Ser. No. 562,072
Claims priority, application Italy, July 8, 1965, 15,269/65
Int. Cl. C08g 1/12
U.S. Cl. 260—67
15 Claims

ABSTRACT OF THE DISCLOSURE

There are disclosed high molecular weight polyoxymethylene copolymers essentially made up of sequences of oxymethylenic units separated by oxyalkylene units derived from an ethylene-diketal of a cyclic diketone containing 4 to 6 carbon atoms in the ring, through opening of at least one of the diketal rings. The ratio of oxymethylene units to the oxyalkylene units is from 6:1 to 1000:1. Preparation of the copolymers in the presence of Lewis acid type catalysts containing chlorine or fluorine is disclosed.

---

The present invention relates to new polyoxymethylene copolymers and to the process for their preparation. More particularly, it relates to new copolymers consisting essentially of oxymethylene sequences and of oxyalkylene units having a completely new structure.

It is known to prepare copolymers having a high thermal stability substantially consisting of repeating —CH$_2$O— units. These products can be obtained by copolymerizing trioxane with particular monomers, e.g., cyclic anhydrides or epoxides. In this last case, the polyoxymethylene polymers contain in the chain

—O—CH$_2$—CH$_2$— units and are characterized by a thermal stability remarkably higher than that of polyoxymethylene homopolymers.

It has now been found that a new class of polyoxymethylene copolymers consisting of oxymethylene sequences and of oxyalkenylene units can be obtained from the opening of cyclic ethylene-diketals of cyclic diketones. In the preparation of these copolymers, the monomeric units of diketal add themselves to the growing polyoxymethylene chain either by opening of only one acetalic group or by opening of both acetalic groups contained in the same molecule. The presence of the said monomeric units in the copolymer makes it possible to remarkably increase the thermal stability and to modify within very wide limits the mechanical properties and the physical-chemical characteristics of polyoxymethylene polymers.

The process of preparation of the new copolymers is characterized in that trioxane is reacted with a cyclic ethylendiketal of a cyclic diketone containing 4 to 6 carbon atoms in the ring, in the presence of catalysts of the Lewis acid type containing chlorine or fluorine, at temperatures between 30° and 120° C., preferably between 50° and 90° C. The cyclic diketals of cyclic diketones used according to the present invention, are obtained from the relevant diketones and from ethylene glycol, in presence of an acidic resin and of benzene in order to eliminate water as azeotropic mixture. Suitable ethylendiketals, are, for instance, those obtained from 1,3-cyclobutandione (I), tetramethyl-1,3-cyclobutandione (II), and of 1,4-cyclohexandione (III), with ethylene glycol.

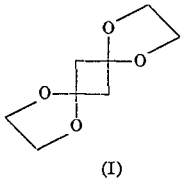
(I)

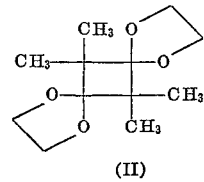
(II)

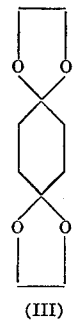
(III)

For the copolymerization with trioxane, these ketals can be either used alone, in admixture with each other, or in admixture with other comonomers, such as: hexahydrobenzo-trioxyepane, hexahydrobenzo-dioxolane, dioxolane, cyclohexanon-ethylenketal, 2,2-dimethyl-dioxolane, and naphthodioxane.

The catalysts used for the preparation of the copolymers according to the present invention are those known in the art for the polymerization of trioxane. Suitable catalysts are the Lewis acids containing fluorine or chlorine atoms, such as antimonium fluoride, antimonium fluoborate, phosphorus pentachloride, ferric chloride, etc.. The preferred catalysts for the copolymerization however, are BF$_3$, FeCl$_3$ and SnCl$_4$. The BF$_3$ may be used alone, or complexed with organic compounds in which oxygen or sulfur is the electron-donor atom, such as BF$_3$·(C$_2$H$_5$)$_2$O and BF$_3$·(CH$_3$)$_2$S. The catalyst must be used in amounts between 0.0001 and 0.1% be weight of trioxane, preferably between 0.001 and 0.01%.

The trioxane used must be anhydrous or substantially anhydrous.

The copolymerization may be carried out either in the presence or absence of solvents. It is preferable to operate in the absence of solvents, but one can also operate in a solution of hydrocarbons such as benzene, cyclohexane, of chloroalkanes, such as methylenechloride, or of nitroarenes, such as nitrobenzene.

The reaction temperature is between 30° and 120° C., preferably between 50° and 90° C.

The copolymers produced according to the present invention substantially consist of oxymethylene sequences separated by oxyalkylene units, in the ratio of about 6:1 up to 1000:1 of oxymethylene units to oxyalkylene units, except, of course, when a third monomer is used. In this latter case, it is possible to produce copolymers substantially consisting of the three monomers reacted.

The products obtained are solids having a melting point between 150° and 175° C., which is lower than that of the polyoxymethylene homopolymer.

Their inherent viscosity measured at 150° C. in dimethylformamide, is comprised between 0.4 and 0.75.

These products can be processed into manufactured articles using the usual molding and extrusion techniques employed for oxymethylene polymers.

3

The following examples illustrate the invention without limiting its scope.

Example 1

120 g. of trioxane are introduced under a nitrogen atmosphere into a 250 cc. three-necked flask provided with a side cock and an agitator.

12 g. of tetramethyl-cyclobutandion-ethylendiketal are then added and the mass is heated to 80° C. while agitating until a homogeneous solution is obtained. By means of a hypodermic syringe and by piercing the rubber plug which the flask neck is provided with, 7 cc. of a 0.07 M solution of $BF_3 \cdot (C_2H_5)_2O$ in nitrobenzene are added.

The polymerization is immediately started but is proceeds at a rather slow rate, and only after 3 hours is a compact polymer mass obtained. The polymerization is then stopped by addition of a methanol excess.

The polymer, reduced to a finely divided powder, is washed with a warm ammonia solution and then with acetone. After drying on the mechanical pump, 105 g. of polymer are weighed.

A sample containing 0.5% of N-phenyl-beta-naphthylamine is heated under vacuum to 180° C. for 2 hours in order to remove the unstable fraction, which amounts to 4%. The weight loss of the residue measured at 225° C. is not higher than 0.04% per minute.

The inherent viscosity of the polymer, measured at 150° C. in dimethylformamide, is 0.4.

Example 2

By following the same technique that was used in Example 1, 120 g. of trioxane are copolymerized with 6 g. of tetramethylcyclobutandion-ethylendiketal. The amount of catalyst used is 3 cc. of a 0.07 M solution of $BF_3 \cdot (C_2H_5)_2O$ in nitrobenzene. After 3 hours, the polymerization is stopped by addition of methanol and the polymer is weighed. A conversion into polymer of 50% by weight is obtained.

As in Example 1, the polymer is taken from the flask, ground, washed with a warm ammonia solution and then with acetone.

A sample containing 0.5% of N-phenyl-beta-naphthylamine is heater under vacuum to 180° C. for 2 hours to remove the unstable fraction, which amounts to 6%. The weight loss of the residue, measured at 225° C., is not higher than 0.05% per minute.

The inherent viscosity of the polymer, measured at 150° C. in dimethylformamide, is 0.73.

Example 3

By following the same technique as that used in Example 1, 120 g. of trioxane are copolymerized with 7 g. of the ethylenediketal of 1,4-cyclohexandione.

The amount of catalyst used is 6 cc. of a 0.07 M solution of $FeCl_3$ in nitrobenzene. After 3 hours, the polymerization is stopped by addition of methanol and the polymer is weighed. A conversion into polymer of 45% by weight is obtained.

The polymer obtained is ground, washed with a warm ammonia solution, and then with acetone.

A sample containing 0.5% of N-phenyl-beta-naphthylamine is heated under vacuum to 180° C. for 2 hours to remove the unstable fraction, which amounts to 4%. The weight loss of the residue, measured at 225° C., is not higher than 0.06% per minute.

The inherent viscosity of the polymer, measured at 150° C. in dimethylformamide, is 0.60.

As will be apparent, various changes in details may be made in the practice of this invention without departing from the spirit thereof. It is intended, therefore, to include in the scope of the appended claims, all such modifications in details as will be obvious to those skilled in the art from the description and working example given herein.

What is claimed is :

1. High molecular weight polyoxymethylene copolymers essentially made up of sequences of oxymethylenic units separated by oxyalkylene units derived from an ethylene diketal of an alicyclic diketone having from 4 to 6 carbon atoms in the ring through the opening of at least one of the diketal rings, and in which the ratio of oxymethylene units to said oxyalkylene units is from 6:1 to 1000:1.

2. Copolymers according to claim 1, in which the ethylene-diketal is obtained from 1,3-cyclobutandione.

3. Copolymers according to claim 1, in which the ethylene-diketal is obtained from tetramethyl-1,3-cyclobutandione.

4. Copolymers according to claim 1, in which the ethylene-diketal is obtained from 1,4-cyclohexandione.

5. Copolymers according to claim 1, in which the oxymethylene sequences are derived from trioxane.

6. Copolymers according to claim 1, having a weight loss at 225° C. of not more than .06% per minute.

7. Copolymers according to claim 1, having a weight loss at 225° C. of not more than .05% per minute.

8. Copolymers according to claim 1, having a weight loss at 225° C. of not more than .04% per minute.

9. Copolymers according to claim 1, which contain units of an additional monomer selected from the group consisting of hexahydrobenzo-trioxyepane, hexahydrobenzo-dioxolane, dioxolane, cyclohexanon-ethyleneketal, 2,2-dimethyl-dioxolane, and naphthodioxane.

10. Copolymers consisting essentially of the oxymethylene and oxyalkylene units specified in claim 1, and having an inherent viscosity of from 0.4 to 0.75, measured in dimethylformamide at 150°.

11. A process for obtaining the copolymers of claim 1, comprising reacting trioxane with at least one cyclic ethylenediketal of an alicyclic diketone containing 4 to 6 carbon atoms in the ring, in the presence of a catalyst of the Lewis acid type containing a halogen selected from chlorine and fluorine, at a temperature between 30° and 120° C.

12. A process according to claim 11, characterized in that the ketal is selected from the group consisting of the ethylenediketal of 1,3-cyclobutandione, tetramethyl-1,3-cyclobutandione and 1,4-cyclohexandione.

13. A process according to claim 11, characterized in that a catalyst selected from the group consisting of $BF_3 \cdot (C_2H_5)_2O$, $BF_3 \cdot (CH_3)_2S$, $FeCl_3$ and $SnCl_4$ is used.

14. A process according to claim 11, characterized in that a catalyst amount between 0.0001 and 0.1% by weight of trioxane is used.

15. A process according to claim 11, in which an additional monomer selected from the group consisting of hexahydrobenzo-trioxyepane, hexahydrobenzo-dioxolane, dioxolane, cyclohexanon-ethyleneketal, 2,2-dimethyldioxolane, and naphthodioxane is reacted.

References Cited

UNITED STATES PATENTS

| 3,252,939 | 5/1966 | Small | 260—67 |
|---|---|---|---|
| 3,346,663 | 10/1967 | Kern et al. | 260—823 |
| 3,372,146 | 3/1968 | Sidi | 260—67 |

WILLIAM H. SHORT, Primary Examiner

L. M. PHYNES, Assistant Examiner

U.S. Cl. X.R.

260—64

UNITED STATES PATENT OFFICE
CERTIFICATE OF CORRECTION

Patent No. USP 3,468,848    Dated September 23, 1969

Inventor(s) Gianfranco Pregaglia et al

It is certified that error appears in the above-identified patent and that said Letters Patent are hereby corrected as shown below:

In the Caption the first inventor should read - -Gianfranco Pregaglia- - instead of "Giafranco Pregaglia".

Signed and sealed this 24th day of September 1974.

(SEAL)
Attest:

McCOY M. GIBSON JR.
Attesting Officer

C. MARSHALL DANN
Commissioner of Patents